United States Patent [19]

Schulz

[11] Patent Number: 4,496,324
[45] Date of Patent: Jan. 29, 1985

[54] BIOMEMBRANE DEMONSTRATION APPARATUS

[76] Inventor: Werner W. Schulz, 3525 Norcross La., Dallas, Tex. 75229

[21] Appl. No.: 428,391

[22] Filed: Sep. 29, 1982

[51] Int. Cl.³ ............................................. G09B 23/36
[52] U.S. Cl. .................................. 434/295; 273/1 L; 434/278
[58] Field of Search ........................ 273/1 L, 145 C; 434/126, 278, 295, 302; 46/91; 272/8 N

[56] References Cited

U.S. PATENT DOCUMENTS

| 163,851 | 6/1875 | Demuth | 272/8 N |
| 484,115 | 10/1892 | Saxton | 273/145 C |
| 947,124 | 1/1910 | Renner | 273/1 L |
| 2,647,748 | 8/1953 | Barringer | 273/1 L UX |
| 3,629,958 | 12/1971 | Olson | 434/126 |
| 4,176,469 | 12/1979 | Timco | 434/126 |

FOREIGN PATENT DOCUMENTS 450161 7/1936 United Kingdom .............. 273/1 L

OTHER PUBLICATIONS

Argo Industries Corp., No. 536, Underwater Diving Rings, Mar., 1965.

Primary Examiner—Harland S. Skogquist
Attorney, Agent, or Firm—Jerry W. Mills; Gregory M. Howison; Nina L. Medlock

[57] ABSTRACT

This invention is a demonstration device to be used in the teaching of the concept of the Fluid Mosaic Membrane. The Biomembrane Demonstration Apparatus consists of a transparent vessel containing two or three immiscible fluids with sufficient difference in density to support layering. Phospholipid molecules are represented by a spherical head region and two tail-like structures; said molecules are of two types, differing in density such that a lipid bilayer is naturally formed along the interfaces between the immiscible fluids. Protein representing molecules are designed to float within either or both lipid layers. The device may be used as a showpiece or as a working demonstration model.

4 Claims, 4 Drawing Figures

BIOMEMBRANE DEMONSTRATION APPARATUS

BACKGROUND AND SUMMARY OF THE INVENTION

In 1972 S. J. Singer and G. L. Nicolson (*Science* Vol. 175, p. 720) proposed that membranes of cells and cellular organelles in living organisms have a basic structure in common which may be described as follows:

Two layers of phospholipid molecules are arranged such that the hydrocarbon chains of said phospholipid molecules face each other and the polar ends of said phospholipid molecules face the intracellular or extracellular water. Interspersed between said phospholipid molecules are large protein molecules which traverse either or both of the lipid layers. The molecules of lipids and proteins are not chemically bonded to each other but can move laterally within the layers without interrupting continuity of said layers. The free movement of the proteins has been compared to "icebergs floating in a sea of water," and thus the term "Fluid Mosaic Membrane" has been adopted for this concept of membrane structure. Said concept is now generally accepted by the scientific community. The unique structure of the phospholipid molecules, being electrically charged or hydrophilic at one end, and neutral or hydrophobic on the other end, is responsible for a thermodynamic equilibrium which is represented by bilayer arrangement. Thus, whenever placed in an aqueous environment, phospholipids will tend to form bilayers.

This invention is a demonstration apparatus to be used in the teaching of biomembrane structure and fluidity. To my knowledge, it is original in its entirety; no such device has been built or suggested in any literature. The biomembrane demonstration apparatus consists of a transparent vessel containing two or three layers of immiscible fluids with sufficient difference in density to support layering. Each phospholipid molecule is represented by a spherical or polygonal head region (charged polar group) to which one or two slender tail-like structures (hydrocarbon chains) are attached. The model phospholipid molecules which form the lower lipid layer are constructed such that the head was a greater density than the fluid in the middle layer and the tail or tails have a lower density than said fluid in the middle layer, the combined density being intermediate between the densities of the bottom and middle fluid layers; with these conditions met, the heads float at the interface between said bottom and middle fluid layers, their tails pointing upward into said middle fluid layer. Similarly, the model phospholipid molecules which form the upper layer have a head density lower than the middle fluid layer and tails of a density greater than said middle fluid layer; the combined density of head and tails being intermediate between middle and upper fluid layers; with these conditions met, the heads float at the interface between said middle and upper fluid layers, their tails pointing downward into said middle fluid layer. The structures representing protein molecules are made of a compact or elongated shape; the density distribution within said model protein molecule and the overall density being adjusted such that said model protein molecule floats within either lipid layer or extends through both lipid layers.

One suggested form of the biomembrane demonstration apparatus consists of a small glass aquarium, a bottom layer of water, a middle layer of mineral oil and a top layer of air. The model phospholipid heads are made of plastic beads for the lower layer and of polystyrene spheres for the upper layer. The model phospholipid tails consist of sealed microtubing for the lower layer and insulated copper wire for the upper layer. Model protein molecules are constructed of segments of polyvinylchloride pipe, matching rubber leg tips and iron washers for weight and density adjustment.

When a mixture of described phospholipid and protein model molecules is poured into the vessel containing the layered immiscible fluids, said model molecules upon gentle agitation seek their proper position and result in a representative "Fluid Mosaic Membrane" bilayer just as thermodynamic law would dictate in the real biomembrane. Model proteins can be moved laterally within the model lipid bilayer without interrupting the continuity of said bilayer. Thus the invention allows vivid visualization of the structure and fluidity of biomembranes.

BRIEF DESCRIPTION OF THE DRAWINGS

The invention in one of many alternate forms is shown on the drawings wherein.

DETAILED DESCRIPTION OF THE DRAWINGS

Figure 1:
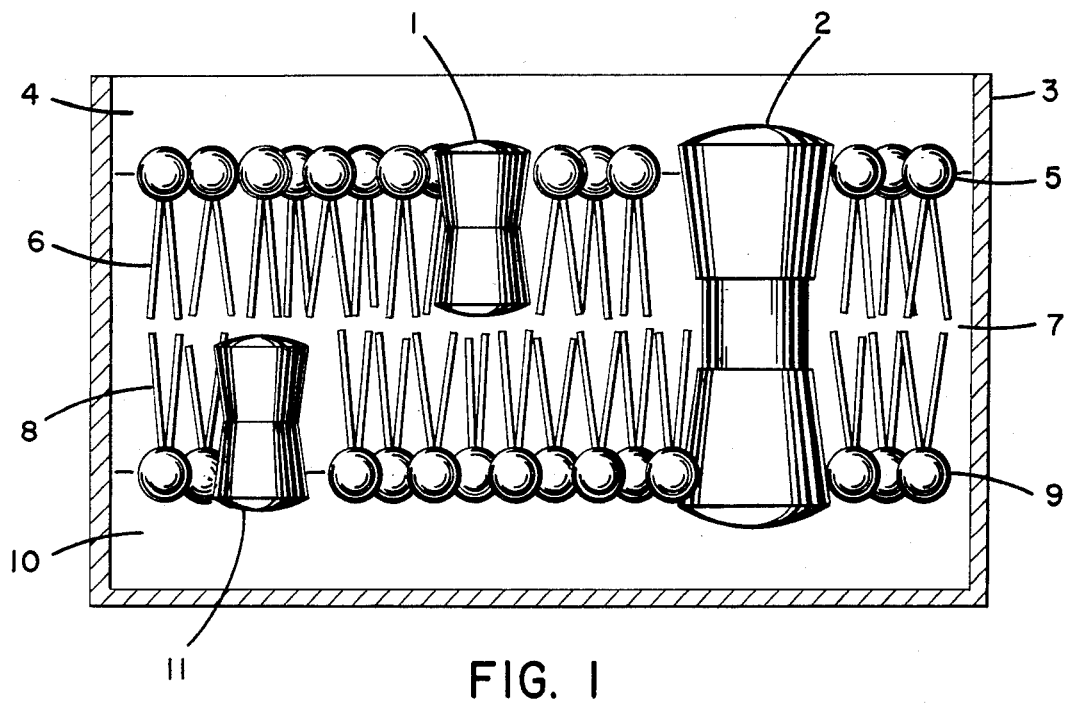
FIG. 1 is a straight frontal view of the assembled apparatus.
Figure 2:
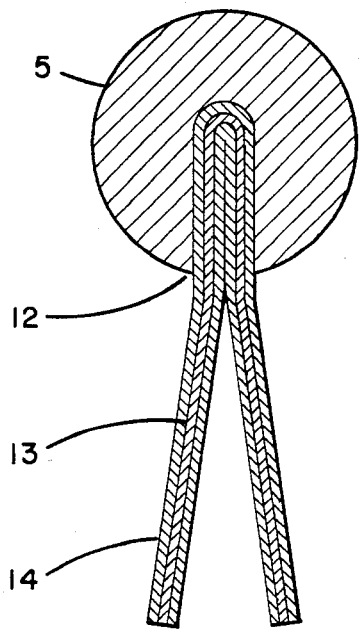
FIG. 2 is a longitudinal section through the structure representing a phospholipid molecule in the upper layer.
Figure 3:
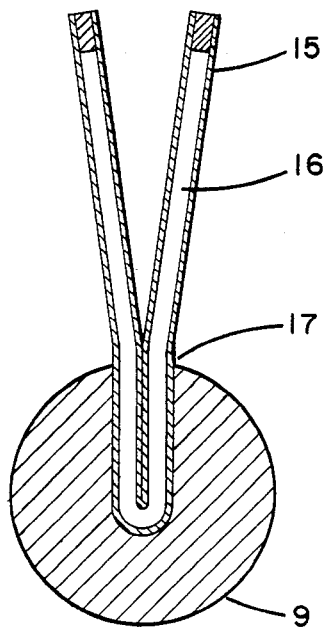
FIG. 3 is a longitudinal section through the structure representing a phospholipid in the lower layer.
Figure 4:
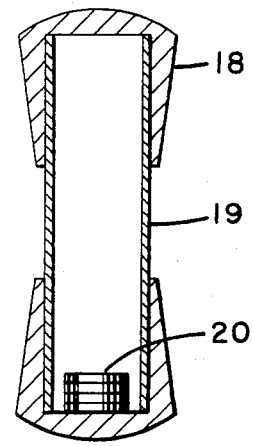
FIG. 4 is a longitudinal section through the structure representing a protein molecule.

In the drawing 3 designates an open transparent vessel which is filled with a bottom fluid layer of water 10, a middle layer of mineral oil 7, and a top layer of air 4. The model molecules representing the upper layer of phospholipids consist of polystyrene spheres 5 which have less density than the mineral oil 7, and of tail-like segments 6 which have greater density than said mineral oil 7, the average density of the combined structures 5 and 6 being intermediate between the densities of air 4 and mineral oil 7. The tail segments 6 consist of copper wire 13 which is insulated with plastic 14 and attached to polystyrene sphere 5 by insertion into a narrow hole 12 where it is held in place by friction or adhesive.

The model molecules representing the lower layer of phospholipids consist of plastic beads 9 having a density greater than the mineral oil 7, and of tail segments 8 having a density less than said mineral oil 7, the average density of both components 8 and 9 being intermediate between the densities of mineral oil 7 and water 10. The tail segments 8 consist of sealed polyvinyl microtubing 15 containing air or any other gas 16, said tubing 15 being held in place in hole 17 within the plastic bead 9 by friction.

The model protein molecules 1, 2, and 11 consist of a plastic tubular segment 19 which is sealed on both ends with plastic or rubber leg tips 18. Iron washers or similar weights 20 allow adjustment of overall weight distribution and density such that said protein molecules float within either of the phospholipid layers as shown for 1 and 11 or extend through both layers as shown for 2.

The vessel 3 may be left open for removal and reintroduction of components in demonstrating attainment of thermodynamic equilibrium, or it may be sealed to represent the equilibrium state as a showpiece. A rocking motion of the whole apparatus leads to wavelike distortion of fluid interfaces but maintains continuity of the layers. Protein molecules may be moved laterally within the bilayer by hand from the top or using a magnet near the bottom; thus fluidity of the biomembrane can be vividly demonstrated.

I claim:

1. A biomembrane demonstration apparatus, comprising:

a transparent fluid containing vessel;

a first fluid disposed in said vessel and having a first density;

a second fluid disposed in said vessel and having a density less than said first density;

a third fluid disposed in said vessel and having a density less than said second density, said first, second and third fluids being transparent;

a plurality of first type phospholipid molecular models, each comprised of a head region having a greater density than said second fluid and a tail region having a density less than said second fluid, each of said first models having an average density intermediate between said first and second densities and disposed on said container such that said head region of said first molecular models maintain a position at the boundary between said first and second fluids and said tail segments of said first molecular models orient upwards into said second fluid; and a plurality of second type phospholipid molecular models, each comprised of a head region having a lower density than said second fluid and a tail region having a higher density than said second fluid, each of said second models having an average density intermediate between said second and third fluids and disposed in said vessel such that the position of said head regions of said second molecular model is maintained at the boundary between said second and third fluids and said tail segments of said second molecular models orient downwards into said second fluid.

2. The apparatus of claim 1 wherein said head regions are spherical in shape and said tail regions are tubular in shape.

3. The apparatus of claim 1 wherein said first fluid is comprised of water, said second fluid is comprised of mineral oil and said third fluid is comprised of air.

4. The apparatus of claim 1 and further comprising a protein molecular model having an adjustable density and differing from said first and second modecular models, said protein molecular model comprised of a tubular member having a first end cap disposed on one end thereof and a second end cap disposed on the other end thereof and iron washers disposed in the interior thereof for adjusting the density thereof, the density of said protein molecular model adjustable between a first density intermediate between the density of said first and second liquids and a second density intermediate between the density of said second and third liquids, said density adjustments yielding three density types of said protein molecular models, a first type of float at the level of said first phospholipid models, a second type to float at the level of said second phospholipid models and a third type to float anywhere within said second fluid.

* * * * *

UNITED STATES PATENT AND TRADEMARK OFFICE
CERTIFICATE OF CORRECTION

PATENT NO. : 4,496,324
DATED : January 29, 1985
INVENTOR(S) : Werner W. Schulz

It is certified that error appears in the above-identified patent and that said Letters Patent is hereby corrected as shown below:

Column 3, lines 7-8, "layerally" should be --laterally--.
line 28 "on said container" should be
--in said container--.

Signed and Sealed this

Fourteenth Day of May 1985

[SEAL]

Attest:

DONALD J. QUIGG

Attesting Officer     Acting Commissioner of Patents and Trademarks